United States Patent

Picquendar et al.

[15] 3,641,513

[45] Feb. 8, 1972

[54] READOUT SYSTEM FOR MEMORIES COMPRISING MATRICES OF PHOTOSENSITIVE ELEMENTS

[72] Inventors: Jean Edgar Picquendar; Roger Torguet, both of Paris, France

[73] Assignee: Thomson-CSF

[22] Filed: Aug. 4, 1970

[21] Appl. No.: 60,838

[30] Foreign Application Priority Data

Aug. 12, 1969 France ................................69/27.692

[52] U.S. Cl. ..........................340/173 LM, 350/110, 353/25

[51] Int. Cl. ....................................G11c 13/04, G11c 11/42

[58] Field of Search ..................340/173 LM; 353/25; 350/9, 350/17, 110

[56] References Cited

UNITED STATES PATENTS 3,465,352 9/1969 Carlson ...........................340/173 LM

*Primary Examiner*—Terrell W. Fears

*Attorney*—Cushman, Darby & Cushman

[57] ABSTRACT

A readout system for memories comprises one or more matrices of photosensitive elements. An optical scanning system (3) produces a light beam with a scanning movement a lens system (21–22) transforms said beam into a beam which is flat perpendicularly to the plane of scan, and directs it onto a matrix of photosensitive elements (8) in the form of a line of light (7) covering a line of the matrix for each resolved point of the scanning function.

3 Claims, 2 Drawing Figures

PATENTED FEB 8 1972 3,641,513

READOUT SYSTEM FOR MEMORIES COMPRISING MATRICES OF PHOTOSENSITIVE ELEMENTS

The present invention relates to improvements in memory readout systems, in the context of memories comprising one or more matrices of photosensitive elements.

In the data-processing systems, ever higher speeds of memory readout are needed; because of the speed with which a light beam can be deflected, it has proved advantageous to design memories made up of one or more matrices of photosensitive elements, certain ones of these elements being omitted or short circuited in order to define a bit of information. In accordance with the known methods, the readout of these memories is effected by optical scanning using a focused light beam which successively illuminates the photosensitive elements forming a matrix line, and then passes to the scanning of the next line. The total readout time is thus equal to the line scan time multiplied by the number of lines making up the matrix or frame.

It is an object of the present invention to reduce the total time of readout of a matrix to the time of scanning of a single line of the memory.

The invention will be better understood from a consideration of the ensuing description given here by way of nonlimitative example and illustrated by the attached FIGS. in which.

Figure 1:
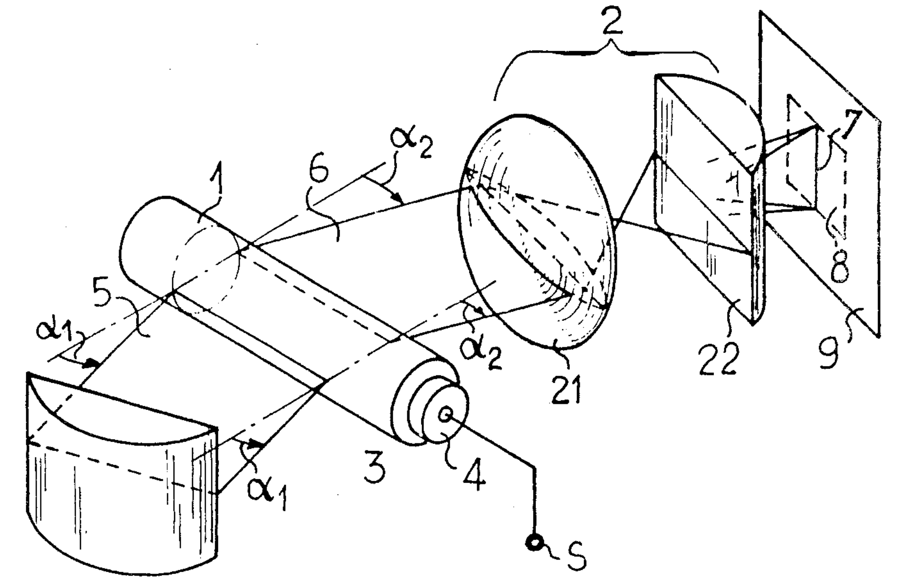
FIG. 1 is the diagram of a readout system in accordance with the invention.

FIG. 1 provides a simplified illustration of a readout system in accordance with the invention, constituted by an optical scanning device 1 and an optical system 2. The optical scanning device illustrated by way of example in the Figure utilizes vessel comprising a cylindrical bar or rod 3 of transparent material such as quartz, corrundum, rutyle etc., . . ., at one end of which there is fixed a piezoelectric transducer 4. A traveling longitudinal acoustic wave is caused to propagate into the bar 3 from one end to the other by exciting the transducer 4 with a high-frequency electrical signal S. The wave fronts are perpendicular to the axis of the bar. A flat beam 5 of parallel monochromatic rays impinges upon a generatrix of the bar 3; these rays are inclined at an angle $\alpha 1$ in relation to the acoustic wave fronts, this angle being chosen so that the light diffraction phenomenon taking place at the elastic compression fringes in the bar, gives rise to the Bragg selective reflection mechanism; the emergent beam 6 due to the refraction phenomenon observed by Bragg is inclined over the wave front at the angle $\alpha 2$, this being the Bragg angle and equal to half the quotient of the optical wavelength over the acoustic wavelength. This beam is in the same plane as the incident beam, the angle of incidence $\alpha 1$, remaining constant the selective reflection mechanism can be produced for various values of the acoustic frequency comprised in a predetermined frequency band. However the angle $\alpha 2$ remains a function of the instantaneous frequency and varies. If acoustic waves are injected into the waves, these waves having a variable frequency, comprised in the frequency band, the diffracted beam has a scanning movement in its own plane. In other terms, the cross section of the beam by a plane perpendicular thereto, is carried by the same straight line, and slides during the scanning time along this line.

In accordance with the invention, the diffracted beam 6 passes through a known optical system 2 which transforms it into a flat beam extending in a plane perpendicular to that of the incident beam and this causes the appearance of a line of light 7 on a memory 8 (shown by a dotted rectangle) consisting of a matrix of photosensitive elements on a plate or wafer 2, this line covering a column of the matrix. The scanning motion of the diffracted beam 6, has for consequence that the line of light 7 scans the whole surface of the matrix 8, during a single period of the scanning. For each resolved point in the scanning function, the light line 7 excites in one go all the photosensitive elements covered by a line or column of the matrix. This optical system comprises for example a convergent lens 21 and a cylindric lens 22. This latter lens has a plane surface parallel to the focal plane of lens 21. There is no problem at all in designing electronic circuits which are capable of processing the results of a readout operation carried out simultaneously on all the photosensitive elements of a matrix line. Consequently, the system in accordance with the invention makes it possible to read out a matrix in a single scan, i.e., much more rapidly that is possible with the known systems in which readout requires scanning line by line.

Figure 2:
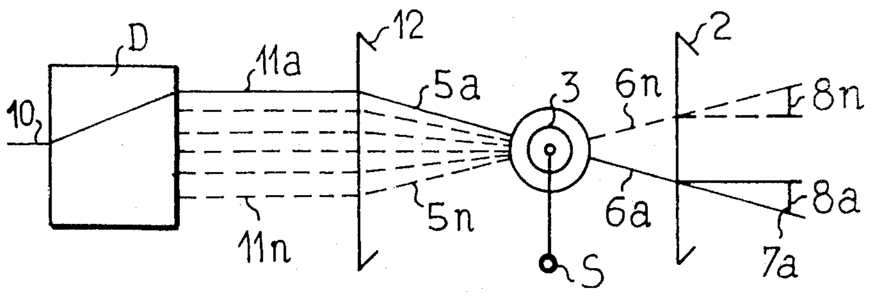
FIG. 2 is a diagram of another embodiment of the system in accordance with the invention.

FIG. 2 relates to an embodiment of the invention which is designed for the readout of memories comprising several matrices of photosensitive elements 8*a* . . . 8*n* on one and the same substrate. In this case, the beam of incident light 10 is directed onto a digital light deflector D from which it exits parallel thereto but in one of the planes 11*a* . . . 11*n* in accordance with the arrangement of the signals employed to excite the different cells of the deflector D.

Various types of digital line deflectors are already known. The best known are constituted by a series of cells. Each cell comprises an electro-optical crystal (for example potassium diphosphate, potassium dihydrogen phosphate) and a double refracting crystal (for example calcite), depending upon whether the electro-optical crystal of a cell is energized or not, the light will pass through the double refracting crystal of the same cell in one or other of two directions and will leave said cell in one of the above-mentioned planes.

A digital system is able to control the electro-optic signals and in this way, a plane 11 can be selected according to a predetermined program. Each light beam exiting in a plane 11*a* from the deflector is directed (see 5*a*) by a cylindrical lens 12 onto a predetermined generatrix of the vessel 3. As in the case of FIG. 1, the diffracted beam 6*a* passes through an optical system 2 capable of producing a perpendicular beam and of directing it onto one of the matrices 8*a*, causing the appearance of a line of light 7*a*, the latter scanning the matrix 8*a* and thus reading out the information which it contains in a single scan.

If the beams of light exiting from the deflector D in one of the planes 11*a* to 11*n* are used one after the other, then page-by-page readout of the matrices 8*a* to 8*n* of the memory is obtained, i.e., very much more rapid readout than with the known systems which effect line-by-line scanning.

What we claim is:

1. A readout system for memories comprising at least one matrix of photosensitive elements, said system comprising a cylindrical vessel made of transparent material, having two end faces; a transducer coupled to one of said end faces, for exciting in said vessel a traveling sound wave propagating from said one end to the other, having a frequency in a predetermined band; means for directing onto one generatrix of said vessel a flat beam, forming with the wave fronts an angle corresponding to the Bragg angle, for one frequency of said band; optical means adapted to transform the flat emergent beam, forming with said wave front the Bragg angle corresponding to the instantaneous frequency, in a flat beam having a section perpendicular to that of the incident beam, said section covering a column of the matrix.

2. A system as claimed in claim 1, wherein means are provided for frequency modulate said wave, according to a sawtooth law.

3. A readout system as claimed in claim 1, comprising a plurality of matrices, extending in the same plane, and forming a column, and further comprising a digital light deflector, for directing the emergent beam onto one of said matrices, according a predetermined program.

* * * * *